US008515249B2

(12) United States Patent
Wu et al.

(10) Patent No.: US 8,515,249 B2
(45) Date of Patent: Aug. 20, 2013

(54) METHODS AND APPARATUS FOR CREATING AND PLAYING A PLAYABLE UNFINALIZED RECORDABLE DISC

(75) Inventors: Sung-Yang Wu, Hsinchu (TW); Chien-Ming Chao, Taipei (TW); Pin-Chou Liu, Taipei (TW)

(73) Assignee: Mediatek Inc., Hsin-Chu (TW)

( * ) Notice: Subject to any disclaimer, the term of this patent is extended or adjusted under 35 U.S.C. 154(b) by 1882 days.

(21) Appl. No.: 11/403,375

(22) Filed: Apr. 12, 2006

(65) Prior Publication Data

US 2007/0086279 A1 Apr. 19, 2007

Related U.S. Application Data

(60) Provisional application No. 60/596,725, filed on Oct. 17, 2005.

(51) Int. Cl.
*H04N 9/80* (2006.01)

(52) U.S. Cl.
USPC .......................................................... 386/248

(58) Field of Classification Search
USPC .............................. 386/46, 125, 126, 95, 248
See application file for complete search history.

(56) References Cited

U.S. PATENT DOCUMENTS

| 6,408,301 | B1 | 6/2002 | Patton et al. |
| 6,876,612 | B2 * | 4/2005 | Yoneyama et al. ........ 369/47.55 |
| 6,963,952 | B1 | 11/2005 | La |
| 7,136,337 | B2 * | 11/2006 | Marumori et al. ......... 369/53.11 |
| 7,289,401 | B2 | 10/2007 | Horibata |
| 7,319,813 | B2 * | 1/2008 | De Haan ........................ 386/125 |
| 7,477,579 | B2 * | 1/2009 | Okumura ................... 369/47.13 |
| 7,701,815 | B2 * | 4/2010 | Ueda et al. .................... 369/47.1 |
| 8,072,860 | B2 * | 12/2011 | Buban et al. ................ 369/53.24 |
| 2003/0068159 | A1 * | 4/2003 | De Haan .......................... 386/95 |
| 2003/0081525 | A1 * | 5/2003 | Yoneyama et al. ........ 369/59.25 |
| 2003/0152365 | A1 * | 8/2003 | Nagayama ..................... 386/69 |
| 2004/0033054 | A1 | 2/2004 | Haino et al. |
| 2004/0208490 | A1 * | 10/2004 | Akutsu et al. ................. 386/117 |

(Continued)

OTHER PUBLICATIONS

Taiwanese Office Action dated Oct. 30, 2009; Taiwanese Patent Application No. 09820694740; 12 pgs. total; Intellectual Property Office, Ministry of Economic Affairs, R.O.C., Taipei City 106, Taiwan, R. O. C.

*Primary Examiner* — Gelek W Topgyal
(74) *Attorney, Agent, or Firm* — Andrew D. Fortney

(57) ABSTRACT

Methods, apparatus, and systems for writing a playable unfinalized disc. The method generally includes the steps of (a) recording data to the disc, (b) calculating a length of metadata based at least in part on a writing position on the disc, (c) determining a content of the metadata based at least in part on a data format and/or a disc format, and (d) recording the metadata to the disc at a position following and adjacent to the data. The apparatus generally includes (a) a disc loader configured to write data to the disc and to write metadata to the disc at a position following and adjacent to the data, and (b) a burning engine configured to send the data to the disc loader and to calculate a length of the metadata based at least in part on a writing position on the disc. The present invention advantageously allows users to view and/or share video content at any time without finalizing the disc (e.g., without recording on the lead-in area of the disc). Thus, users may append additional data to the unfinalized disc, and thereby more fully utilize space on the disc.

26 Claims, 5 Drawing Sheets

(56) References Cited

U.S. PATENT DOCUMENTS

2005/0089314 A1    4/2005   Chung et al.
2005/0152688 A1    7/2005   Chen et al.
2006/0072411 A1*   4/2006   Fujishiro ............... 369/53.2
2010/0023540 A1*   1/2010   Hirose et al. ............ 707/101

* cited by examiner

METHODS AND APPARATUS FOR CREATING AND PLAYING A PLAYABLE UNFINALIZED RECORDABLE DISC

This application claims the benefit of U.S. Provisional Application No. 60/596,725, filed Oct. 17, 2005.

FIELD OF THE INVENTION

The present invention generally relates to the field of optical disc recording. More specifically, embodiments of the present invention pertain to methods and apparatus for recording playable unfinalized recordable discs.

DISCUSSION OF THE BACKGROUND

DVD technology comprises a wide and growing variety of disc and application specifications. Disc specifications include, for example, DVD-ROM for pre-recorded discs, DVD-R and DVD+R for write-once discs, and DVD-RW, DVD-RAM, and DVD+RW for rewritable discs. The disc format specifications generally define the physical characteristics of the disc (e.g., mechanical properties, optical signal characteristics, physical arrangement, writing methods, and testing conditions). Application specifications include DVD-Video for video content, DVD-Audio for audio content, and DVD-VR and DVD+VR for real-time video recording (e.g., in camcorders and personal video recorders [PVRs]).

The structure and format of data recorded to optical media is generally defined and described in the family of Universal Disk Format (UDF) specifications. The Optical Storage Technology Association (OSTA) has developed and implemented the UDF to enable file interchange among different operating systems and environments. In general, UDF was developed to implement the ISO/IEC 13346 specification (also known as ECMA 167). Whereas ISO/IEC 13346 is a broad, general standard for storing information on any media, the UDF specifically provides a standard for recording data to a plurality of recordable and rewritable optical media including CD-ROM, CD-Recordable (CD-R), and CD-Rewritable (CD-RW) as well as DVD-ROM, DVD-R, DVD-RW, DVD+R, DVD+RW, double density media, multi-layered media, and others. Although terms such as "operating system," and the process of recording data, suggest a computer system environment, UDF is generally applicable to and defines the format for consumer CD audio devices for home and mobile audio systems, consumer DVD devices for both home and mobile DVD audio/visual systems, in addition to the many and varied computer system environments.

The UDF specification includes a number of revisions, some of which were developed and released to capture and implement standards for emerging and developing optical media technologies. By way of example, UDF Revision 1.02 includes standards and formats for DVD devices; UDF Revision 1.50 includes standards and formats for defect management and packet writing; UDF Revision 2.0 includes standards and formats intended to supersede Revision 1.50, and adds standards and formats for streaming and improved security control for optical media; and UDF Revision 2.01 includes standards and formats to update Revision 2.0, and adds standards and formats for real time files.

Multi-session and multi-border recording to optical media is an example of one advancement in optical media technology that was captured in the UDF during the periodic revision cycle. Prior to UDF Revision 1.50, no multi-session or multi-border standards or formats were implemented in the UDF. Beginning with UDF Revision 1.50, multi-session and multi-border recording is implemented in UDF. UDF Revision 1.02, however, does not include implementation of multi-session or multi-border recording, and therefore DVD devices compliant with UDF Revision 1.02 do not support multi-session or multi-border optical media. Consumer DVD devices such as, by way of example, DVD players used with television sets or audio/visual systems are generally UDF Revision 1.02 compliant, and therefore do not support or recognize multi-session or multi-border optical media. Generally, if a multi-session or multi-border DVD is inserted into a UDF Revision 1.02 compliant consumer DVD player, the consumer DVD player will only "see" one session. Typically, only the first session of the multi-session DVD is seen by the consumer DVD player, and therefore only the content of the first session is accessible for viewing.

The DVD-Video format was originally designed to meet the requirements of the film industry for distributing commercial movies on prerecorded (pressed) discs. Typically, discs written in DVD-Video format can be played back using most standards-compliant DVD video players or computer DVD-ROM drives employing appropriate software (subject to that device's physical compatibility with the specific type of disc). Recordable DVD formats may also contain DVD-Video data. Referring now to FIG. 1, DVD-Video data is shown on DVD-ROM, DVD+R, and DVD-R discs.

Due, in part, to the evolving nature of the DVD specifications, there can be mismatches between the application format and the capabilities of the disc format. For example, the DVD-Video format was initially designed to place static material on disc, and not to add to or change the material at a later time. To address this, several additional application formats were developed for use by consumer devices (e.g., writable DVD camcorders and consumer electronics [CE] recorders such as personal video recorders [PVRs]). Two of these new formats are the DVD-VR and DVD+VR real-time video formats. However, DVD-VR differs significantly from the original DVD-Video format. As a result, only devices specifically designed to be DVD-VR compatible (for example, units marked "RW compatible" and "DVD Multi") can play DVD-VR recorded discs.

In many optical disc specifications, an optical disc may comprise two areas, including a user data area and a disc information (lead-in) area. The user data area is generally used to write application data, including video, audio, information tables, file system data, etc. The disc information (lead-in) area generally includes data such as disc size, disc type, disc layout, etc. In some optical disc specifications (e.g., DVD-R and DVD+R), any portion of the disc can be written only once, although subsequent titles may be recorded to previously unused portions of the disc.

In order to perform real-time recording (e.g., in camcorders and PVRs), data may generally be written to the user data area of the disc. Each time additional material is recorded to the disc, the additional data may be appended to the previously written data. Once the user wishes to playback the disc on a standard DVD-Video player, the user must generally "finalize" the disc, in order to populate the disc information (lead-in) area of the disc. Once the write-once disc is finalized, it is effectively a read-only disc, because the disc information (lead-in) area cannot be changed. Consequently, any remaining space on the disc is generally unusable.

Therefore, it is desirable to write real-time video data to write-once discs that can be played back (or to which more data can be added) without finalization.

A disc generally comprises a sequence of error correction code (ECC) blocks. In the DVD standards, each ECC block generally contains 16 sectors of 2,048 data bytes each. Sectors are numbered with a 24-bit address. An ECC block generally further includes headers, error detection code (EDC) symbols, and ECC symbols. Individual sector data are generally interleaved in order to minimize the effects of large media flaws. These ECC blocks are generally recorded serially on the medium. In order to read and extract a single sector of data, a disc reader generally reads the ECC block containing the sector, applies error correction to the ECC block, and de-interleaves prior to extracting the data from the selected sector.

Typically, the finalized disc information (lead-in) area contains the location of the final ECC block on the disc. The final ECC block typically contains metadata such as volume structure information (e.g., Virtual Allocation Table [VAT] on DVD-R discs, or reserve space allocation table [RSAT] on a DVD+R disc). Therefore disc players generally must locate the final ECC block in order to retrieve volume information and read the data on the disc.

DVD-R and DVD+R discs can be either single or double-sided. A single-sided (SS) disc may include a recordable side and a non-recordable ("dummy") side, while a double-sided (DS) disc may include two recording sides. The recording side of a DVD-R and DVD+R disc may include a number of layers. The substrate is generally a polycarbonate plastic containing a shallow spiral groove extending from the inside to the outside diameter of the disc. A DVD-R disc additionally includes "pits and lands" on the areas between the coils of the groove (land pre-pits). Added to this substrate is an organic dye recording layer (e.g., azo, cyanine, dipyrromethene or others), followed by a metal reflective layer (e.g., silver, silver alloy, gold). The non-recordable side of a single-sided disc generally includes an additional flat polycarbonate plastic substrate (sometimes with an additional metal layer to obscure the bonding layer from view for aesthetic purposes). An adhesive then bonds two recording sides (for a double-sided) or a recording and dummy side (for a single-sided) together into the final disc. Some single-sided discs are also topped on the dummy side with decorations or additional layers that provide surfaces suitable for labeling by inkjet, thermal transfer or re-transfer printers.

The first step in manufacturing a DVD-R or DVD+R disc is to fabricate the polycarbonate plastic substrates (incorporating the spiral groove and land pre-pits) using an injection molding process. The dye is then applied using spin coating and the metal layers by means of DC sputtering. After both sides of the disc are completed they are bonded together using a hot melt, UV cationic or free radical process. Additional decoration or printable layers are typically applied using screen printing methods. A DVD-R disc generally undergoes a further manufacturing step in which a specialized computer DVD recorder is used to "prewrite" information in the Control Data Zone of its Lead-in Area to inhibit direct copying of prerecorded DVD-Video discs encrypted with the Content Scrambling System (CSS).

DVD recording devices generally use a wobble signal transducer to demodulate the spiral groove and determine where data starts, the format of the discs, etc. Unlike DVD recording devices, many DVD players can not decode the wobble signal (e.g., address in pre-groove [ADIP] or pre-pit address encodings). Therefore it may be difficult for such players to move the pick-up head(s) to the last metadata section of the disc and read the data back. It is desirable to write the metadata in such a way that players (e.g., players without wobble signal transducers) may find it more easily.

SUMMARY OF THE INVENTION

Embodiments of the present invention relate to methods and apparatus for writing a playable unfinalized disc. The method generally comprises the steps of (a) recording data to the disc, (b) calculating a length of metadata based at least in part on a writing position on the disc, (c) determining a content of the metadata based at least in part on a data format and/or a disc format, and (d) recording the metadata to the disc at a position following and adjacent to the data. The apparatus generally comprises (a) a disc loader configured to write data to the disc and to write metadata to the disc at a position following and adjacent to the data, and (b) a burning engine configured to send the data to the disc loader and to calculate a length of the metadata based at least in part on a writing position on the disc. The systems generally comprise those that include a disc writing apparatus, embodying one or more of the inventive concepts disclosed herein.

The present invention advantageously writes the metadata in such a way that a player may more easily find the last metadata section on the disc. In particular, the longer the metadata section, the greater the chance of the DVD player's pickup heads finding the metadata. In order not to waste too much space on the metadata, however, the length of the metadata can be calculated based on the writing position such that a desired number of tracks (when the disc is treated as if comprising a plurality of concentric circles, each circle may be called a track) are occupied by the metadata. In order for the metadata to occupy an adequate number tracks, the length of the metadata should generally be longer in outer areas of the disc than in inner areas of the disc.

The present invention advantageously allows users to view and/or share video content at any time without finalizing the disc (e.g., without recording on the lead-in area of the disc). Thus, users may append additional data to the unfinalized disc, and thereby more fully utilize space on the disc.

These and other advantages of the present invention will become readily apparent from the detailed description of preferred embodiments below.

DETAILED DESCRIPTION OF THE PREFERRED EMBODIMENTS

Figure 1:
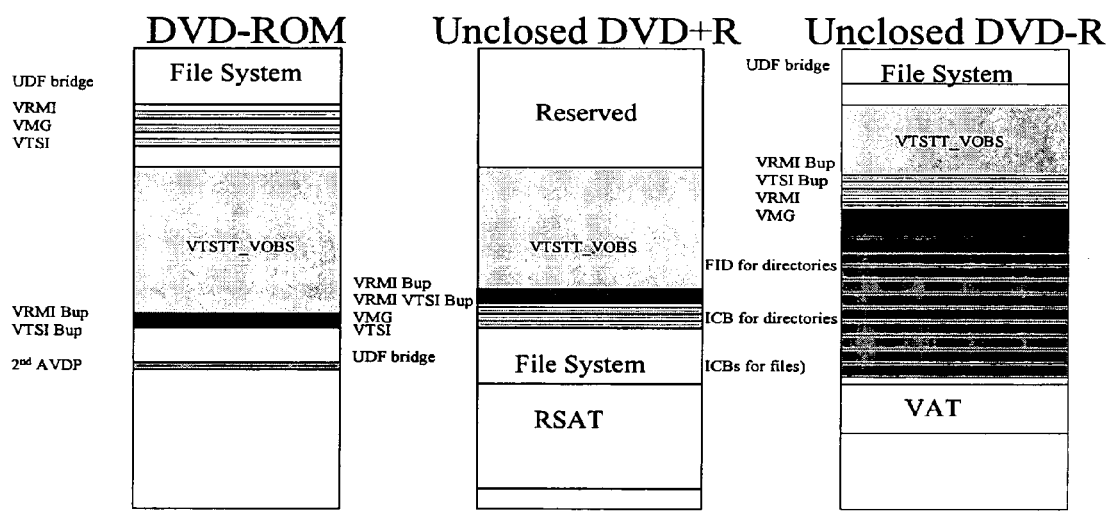
FIG. 1 is a diagram showing conventional disc structures.

Reference will now be made in detail to the preferred embodiments of the invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications, and equivalents that may be included within the spirit and scope of the invention as defined by the appended claims. Furthermore, in the following detailed description of the present invention, numerous specific details are set forth in order to provide a thorough understanding of the present invention.

However, it will be readily apparent to one skilled in the art that the present invention may be practiced without these specific details. In other instances, well-known methods, procedures, components, and circuits have not been described in detail so as not to unnecessarily obscure aspects of the present invention.

Some portions of the detailed descriptions which follow are presented in terms of processes, procedures, logic blocks, functional blocks, processing, and other symbolic representations of operations on data bits, data streams, or waveforms within a computer, processor, controller, and/or memory. These descriptions and representations are generally used by those skilled in the data processing arts to effectively convey the substance of their work to others skilled in the art. A process, procedure, logic block, function, operation, etc., is herein, and is generally, considered to be a self-consistent sequence of steps or instructions leading to a desired and/or expected result. The steps generally include physical manipulations of physical quantities. Usually, though not necessarily, these quantities take the form of electrical, magnetic, optical, or quantum signals capable of being stored, transferred, combined, compared, and otherwise manipulated in a computer, data processing system, or logic circuit. It has proven convenient at times, principally for reasons of common usage, to refer to these signals as bits, waves, waveforms, streams, values, elements, symbols, characters, terms, numbers, or the like.

It should be borne in mind, however, that all of these and similar terms are associated with the appropriate physical quantities and are merely convenient labels applied to these quantities. Unless specifically stated otherwise and/or as is apparent from the following discussions, it is appreciated that throughout the present application, discussions utilizing terms such as "processing," "operating," "computing," "calculating," "determining," "manipulating," "transforming," or the like, refer to the action and processes of a computer, consumer electronics, data processing system, logic circuit or similar processing device (e.g., an electrical, optical, or quantum computing or processing device), that manipulates and transforms data represented as physical (e.g., electronic) quantities. The terms refer to actions, operations and/or processes of the processing devices that manipulate or transform physical quantities within the component(s) of a system or architecture (e.g., registers, memories, other such information storage, transmission or display devices, etc.) into other data similarly represented as physical quantities within other components of the same or a different system or architecture.

Furthermore, for convenience and simplicity, the terms "data," "data stream," "waveform" and "information" may be used interchangeably, as may the terms "connected to," "coupled with," "coupled to," and "in communication with" (which terms also refer to direct and/or indirect relationships between the connected, coupled and/or communication elements unless the context of the term's use unambiguously indicates otherwise), but these terms are also generally given their art-recognized meanings. In addition, while reference may be made to operations concerning representations of video data, it will be recognized that the same or similar operations may be applied to arbitrary data types (e.g., audio data), or that the video data may further comprise audio or other data (e.g., subtitles, programming data, etc.)

The present invention concerns a method for writing a playable unfinalized disc. The method generally comprises the steps of (a) recording data to the disc, (b) calculating a length of metadata based at least in part on a writing position on the disc, (c) determining a content of the metadata based at least in part on a data format and/or a disc format, and (d) recording the metadata to the disc at a position following and adjacent to the data. The software is generally configured to implement the present method and/or any process or sequence of steps embodying the inventive concepts described herein.

A further aspect of the invention concerns an apparatus for writing a playable unfinalized disc. The apparatus generally comprises (a) a disc loader configured to write data to the disc and to write metadata to the disc at a position following and adjacent to the data, and (b) a burning engine configured to send the data to the disc loader and to calculate a length of the metadata based at least in part on a writing position on the disc. Even further aspects of the invention concern systems that generally comprise those that include a disc recording apparatus, embodying one or more of the inventive concepts disclosed herein.

The invention, in its various aspects, will be explained in greater detail below with regard to exemplary embodiments.

An Exemplary Method

In one aspect, the present invention relates to a method for writing a playable unfinalized disc. The method generally comprises the steps of (a) recording data to the disc, (b) calculating a length of metadata based at least in part on a writing position on the disc, (c) determining a content of the metadata based at least in part on a data format and/or a disc format, and (d) recording the metadata to the disc at a position following and adjacent to the data.

Figure 2:
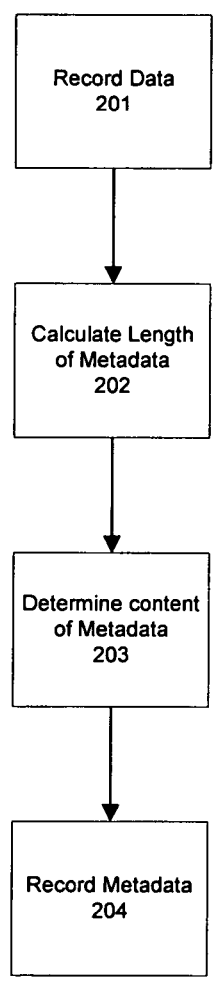
FIG. 2 is a flowchart showing an exemplary method according to the present invention.

Referring now to FIG. 2, an exemplary flowchart is shown. In step 201, user data (e.g., video and/or audio data) may be recorded to the disc. In step 202, the length of the metadata may be calculated dynamically according to the final writing position of the user data. In general, the more tracks occupied by the metadata, the easier it will be for the pickup heads of the player to find and read the metadata. In order not to consume an excessive amount of space, the metadata may be shorter on an inner area of the disc than on an outer area of the disc. Thus, in another embodiment, the calculating step may further comprise calculating a length of the metadata sufficient to occupy a predetermined number of tracks at a predetermined location (e.g., the final writing position of the user data).

Figure 3:
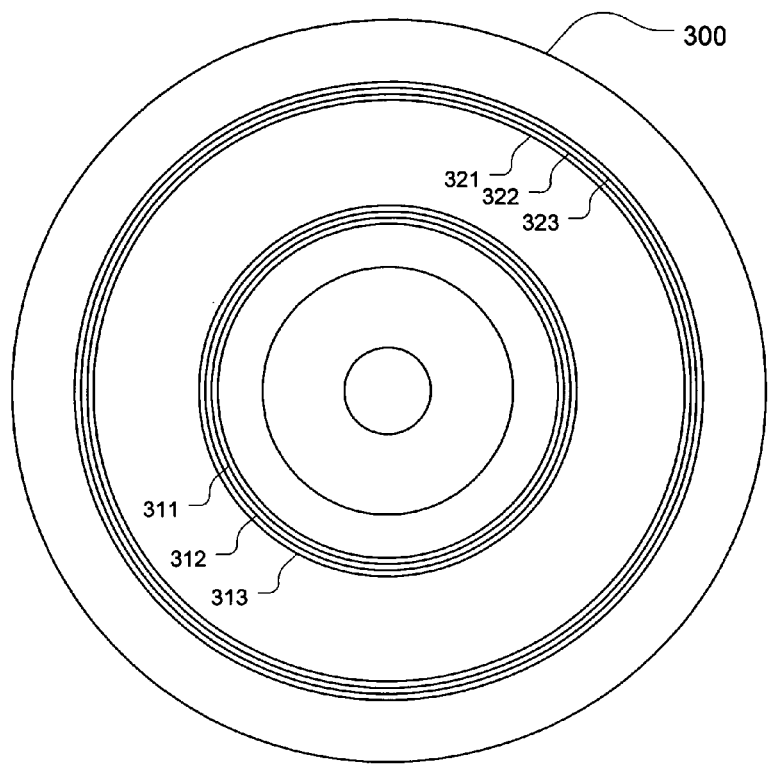
FIG. 3 is a diagram showing exemplary track sizes/lengths at various locations on a disc.

The design and/or implementation of logic to calculate such a recording length is well within the abilities of those skilled in the art. For example, referring now to FIG. 3, the spiral groove of disc 300 may be approximated as concentric rings (e.g., tracks) 311-313, and 321-323. The length of each track 321-323 (toward the outer edge of the disc) is clearly longer than the length of each track 311-313 (toward the inner edge of the disc). Thus, metadata written toward the outer edge of the disc should generally be longer than metadata written toward the inner edge of the disc in order to occupy the same number of tracks. This number of tracks may be, for example, from 1 to 10, or any range of numbers in between (e.g., 2 to 5).

In step 203, the content of the metadata may be determined. The content of the metadata will generally depend at least in part on the disc format. For example, the metadata may comprise a file position mapping table as pattern data (e.g., RSAT tables for DVD+R discs, or VAT tables for DVD-R discs, as shown in FIG. 1). The metadata may further comprise pointers to the file structure data, which may reside in the current title's user data, a prior title's user data, or a prior title's metadata. The metadata may also comprise information about the written user data, including file length, video length, files position, etc. It will be recognized that metadata is not limited to one or a combination of these types of data (e.g., the metadata may simply comprise random or patterned data). It will also be recognized that the metadata may be repeated to satisfy a desired metadata length as calculated in step 202.

Therefore, in an embodiment of the present method the metadata may comprise file position mapping data. In some implementations, the file position mapping data may comprise file position mapping tables (which may further comprise RSAT tables or VAT tables). In another embodiment, the metadata may comprise pointers to the file position mapping data. In yet another embodiment, the metadata may comprise file length data. Finally, in step 204, the metadata may be written to the disc. In various embodiments, metadata may be written (i) at a predetermined locations, (ii) for (or over) a calculated length, (iii) on a predetermined and/or calculated number of tracks, etc.

Figure 4:
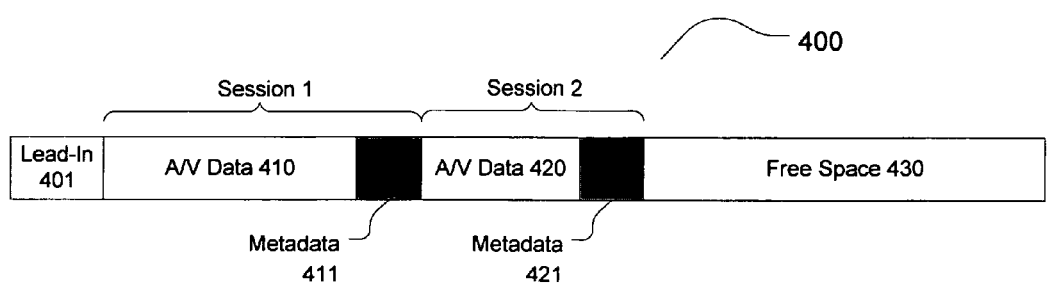
FIG. 4 is a diagram showing exemplary locations of user data and metadata on a multi-title disc.

Referring now to FIG. 4, an exemplary disc 400 with two titles is shown. Lead-in area 401 is generally blank, unless the disc is later finalized. User data areas 410 and 420 are followed by metadata areas 411 and 421, respectively. Free space area 430 remains available for writing further data to the disc.

In a preferred embodiment, the present method is particularly applicable to optical discs. Specifically, the method is particularly useful for write-once disc formats such as DVD-R discs and/or DVD+R discs.

In order to maintain compatibility with standard disc readers, the method may include (a) writing one or more titles according to the method of the present invention, then (b) finalizing the disc. Referring again to FIG. 4, after the final title is written to the disc, lead-in area 401 may be written for compatibility with standard DVD-Video players.

Exemplary Software

The present invention also includes algorithms, computer program(s), and/or software, implementable and/or executable in a general purpose computer or workstation equipped with a conventional digital signal processor, configured to perform one or more steps of the method and/or one or more operations of the hardware. Thus, a further aspect of the invention relates to algorithms and/or software that implement the above method(s). For example, the invention may further relate to a computer program, computer-readable medium or waveform containing a set of instructions which, when executed by an appropriate processing device (e.g., a signal processing device, such as a microcontroller, microprocessor or DSP device), is configured to perform the above-described method and/or algorithm.

For example, the computer program may be on any kind of readable medium, and the computer-readable medium may comprise any medium that can be read by a processing device configured to read the medium and execute code stored thereon or therein, such as a floppy disk, CD-ROM, magnetic tape or hard disk drive. Such code may comprise object code, source code and/or binary code.

The waveform is generally configured for transmission through an appropriate medium, such as copper wire, a conventional twisted pair wireline, a conventional network cable, a conventional optical data transmission cable, or even air or a vacuum (e.g., outer space) for wireless signal transmissions. The waveform and/or code for implementing the present method(s) are generally digital, and are generally configured for processing by a conventional digital data processor (e.g., a microprocessor, microcontroller, or logic circuit such as a programmable gate array, programmable logic circuit/device, or application-specific [integrated] circuit).

In various embodiments, the computer-readable medium or waveform comprises at least one instruction to (a) cause disc recording hardware to (e.g., a disc loader and/or burning engine) to record user data to a recordable disc, (b) calculate a length of metadata based at least in part on a writing position on the disc, (c) produce a content of the metadata based at least in part on a data format and/or a disc format, and (d) cause the disc recording hardware to record the metadata to the disc at a position following and adjacent to the user data.

The set of instructions may also further comprise at least one instruction to produce the content of the metadata such the metadata includes file position mapping data. In some implementations the file position mapping data may comprise file position mapping tables (which may further comprise RSAT tables or VAT tables). In another embodiment, the software may produce the content of the metadata such that the metadata includes file length data.

In another embodiment, the computer-readable medium or waveform comprises may include at least one instruction to (a) record one or more titles according to the method of the present invention, and (b) cause the disc recording hardware to finalize the disc (e.g., by writing lead-in information to the disc).

An Exemplary Apparatus

Figure 5:
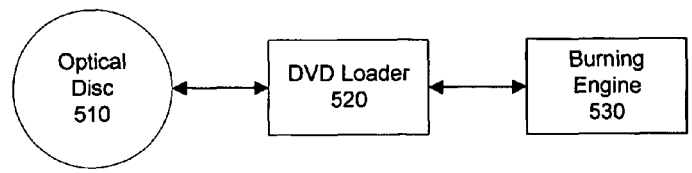
FIG. 5 is a diagram showing an exemplary apparatus according to the present invention.

In another aspect, the present invention concerns an apparatus for writing a playable unfinalized disc. The apparatus generally comprises (a) a disc loader configured to write data to the disc and to write metadata to the disc at a position following and adjacent to the data, and (b) a burning engine configured to send the data to the disc loader and to calculate a length of the metadata based at least in part on a writing position on the disc. Referring now to FIG. 5, an exemplary apparatus is shown. The apparatus includes disc loader 520, which writes to disc 510. The apparatus also includes burning engine 530.

Figure 6:
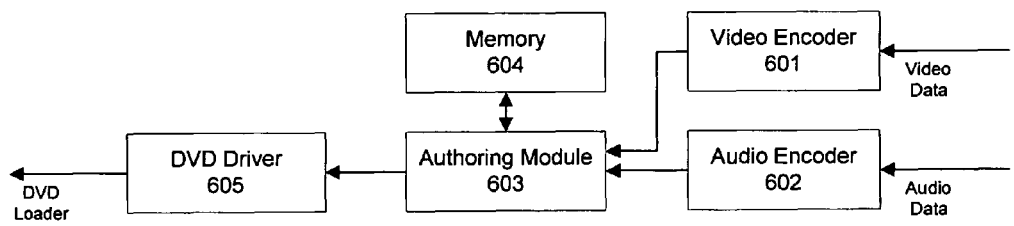
FIG. 6 is a diagram showing a detailed burning engine apparatus according to the present invention.

Referring now to FIG. 6, burning engine 600 (e.g., burning engine 530 of FIG. 5) may comprise video encoder 601 and audio encoder 602 to receive video and audio data, respectively. Video encoder 601 may be configured to accept video data in one or more formats (e.g., analog video data [e.g., NTSC, PAL, SECAM, etc.], MPEG-1, MPEG-2, MPEG-4, M-JPEG, etc.) and to produce video data encoded according to the appropriate disc standard (e.g., MPEG-2 for DVD-Video discs). Similarly, audio encoder 602 may be configured to accept audio data in one or more formats and to produce audio data encoded according to the appropriate disc standard. It is well within the abilities of a person skilled in the art to design and implement such video and audio encoders for any video and audio input formats required by a particular application.

Burning engine 600 may further comprise authoring module 603. Authoring module 603 may simply transfer the encoded video and/or audio data, or may add additional information (e.g., menus, subtitles, and other special features available in the disc format specification). Authoring module 603 may use memory 604 while producing the (encoded) output data (e.g., memory 604 may be used to [temporarily] store encoded and/or unencoded data and/or metadata [which may be embedded in or derived from the encoded and/or unencoded data]). DVD driver 605 generally receives the output of authoring module 603, and sends the data to the disc loader (e.g., disc loader 700 of FIG. 7).

Burning engine 600 generally includes logic configured to perform the steps of the inventive method. For example, authoring module 603 may be configured to provide data to DVD driver 605 for recording to a disc. Authoring module 603 and/or DVD driver 605 may be configured to calculate a length of metadata based at least in part on a writing position on the disc, and to determine a content of the metadata based at least in part on a data format and/or a disc format (e.g. DVD driver 605 may be configured to retrieve physical device format and/or writing position data from the disc loader [e.g., disc loader 520] for use in such calculations and/or determinations). Finally, DVD driver may cause the disc loader (e.g., disc loader 520) to record the metadata to the disc at a position following and adjacent to the data.

Figure 7:
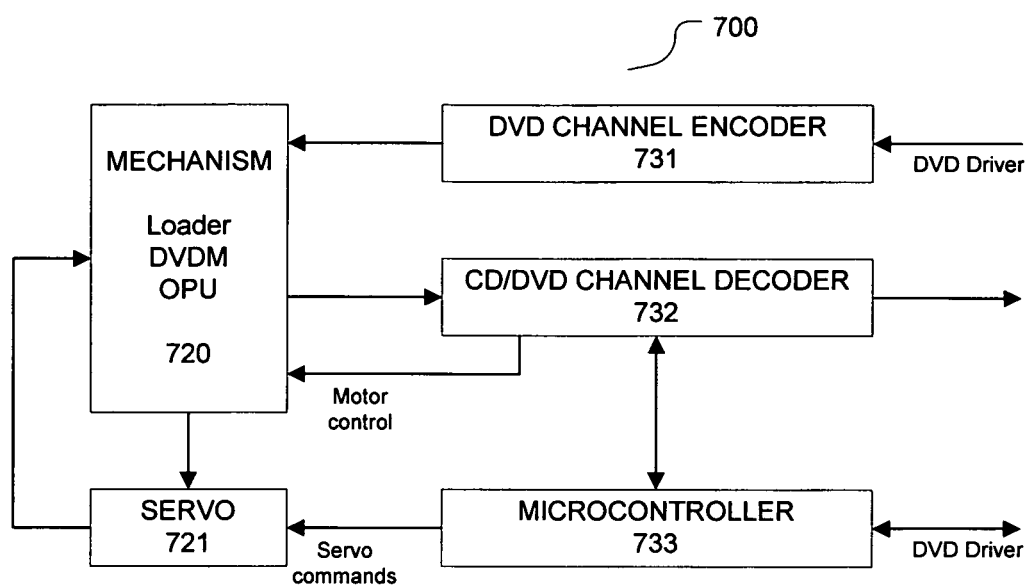
FIG. 7 is a diagram showing a detailed loader apparatus according to the present invention.

Referring now to FIG. 7, DVD loader 700 (e.g., disc loader 520 of FIG. 5) may comprise encoder 731 (e.g., a DVD channel encoder), decoder 732 (e.g., a CD and/or DVD channel decoder), and microcontroller 733. The disc loader generally includes electronics (e.g., circuitry, firmware, and/or software) for encoding and/or decoding data and for controlling the disc mechanism. DVD channel encoder 731 may receive data from a DVD driver (e.g., DVD driver 605 of FIG. 6). Microcontroller 733 may also receive command signals from and/or provide disc status information (e.g., writing position, disc format, etc.) to the DVD driver. Disc mechanism 720 may generally include one or more optical pick-up units (e.g., to read and/or write optical discs using one or more wavelengths of light), a tray loader, a motor, etc.

In a further embodiment, the burning engine may be configured to calculate the length sufficient to occupy a predetermined number of tracks at the writing position (e.g., authoring module 603 and/or DVD driver 605 of burning engine 600 may be configured to perform this calculation). The design and/or implementation of logic to calculate such a recording length is well within the abilities of those skilled in the art. In another embodiment, the metadata may comprise one or more of file position mapping data, file position mapping tables (e.g., file position mapping tables, virtual allocation tables [VAT], and/or reserve space allocation table [RSAT]), pointers to file position mapping data, and/or file length data.

In a preferred embodiment, the disc may comprise an optical disc. Specifically, the disc may comprise a DVD-R or DVD+R disc. It will be recognized that the burning engine may be implemented in hardware, firmware, software, or in any combination thereof.

Exemplary Systems

In a further aspect, the invention relates to a system for recording data to a disc incorporating the methods and apparatus presented herein. The present invention may be implemented as a standalone DVD recording device. In another embodiment, the present invention may comprise a camcorder, comprising a video capture device (e.g., a CCD), a data formatter (e.g., an MPEG compression device), and the disc recording apparatus according to the present invention. In another embodiment, the present invention may comprise a personal video recorder, comprising a tuner (e.g., and ATSC tuner, a QAM tuner, and NTSC tuner, or a satellite signal tuner) and the disc recording apparatus according to the present invention.

A disc recording device according to the present invention may communicate with a host device such as a computer, mobile computing devices such as personal digital assistants, cellular phones, media or MP3 players and the like, and/or other devices via one or more wired or wireless communication links. The disc recording device may be connected to memory such as random access memory (RAM), low latency nonvolatile memory such as flash memory, read only memory (ROM), and/or other suitable electronic data storage.

The disc recording device may communicate with an output device such as a computer, television or other device via one or more wired or wireless communication links. The disc recording device may communicate with mass data storage that stores data in a nonvolatile manner. The mass data storage may include a hard disk drive (HDD).

In another embodiment, the present invention can be implemented in a set top box. The set top box generally receives signals from a source such as a broadband source and outputs standard and/or high definition audio/video signals suitable for a display such as a television and/or monitor and/or other video and/or audio output devices.

Conclusion/Summary

Thus, the present invention provides a method and for writing a playable unfinalized disc. The present invention advantageously writes the metadata in such a way that a player may more easily find the last metadata section (e.g., the last ECC block) on the disc, and enables previewing of recorded data and/or appending of additional data onto an optical disc without finalizing the disc.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the Claims appended hereto and their equivalents.

What is claimed is:

1. A method for writing a playable unfinalized disc, comprising the steps of:
   a) recording data to said disc;
   b) calculating a length of metadata to be recorded based at least in part on a writing position of said data recorded on said disc;
   c) determining a content of said metadata based at least in part on a format of said data and/or a physical format of said disc; and
   d) recording said metadata to said disc at a position following and adjacent to said data.

2. The method of claim 1, wherein said length of said metadata to be recorded is sufficient to occupy a predetermined number of tracks at said writing position.

3. The method of claim 1, wherein said metadata comprises file position mapping data.

4. The method of claim 3, wherein said file position mapping data comprises file position mapping tables.

5. The method of claim 4, wherein said file position mapping tables comprise RSAT tables.

6. The method of claim 4, wherein said file position mapping tables comprise VAT tables.

7. The method of claim 1, wherein said metadata comprises pointers to file position mapping data.

8. The method of claim 1, wherein said metadata comprises file length data.

9. The method of claim 1, wherein said disc comprises an optical disc.

10. The method of claim 9, wherein said disc comprises a DVD-R disc.

11. The method of claim 9, wherein said disc comprises a DVD+R disc.

12. A method for creating a finalized disc, comprising the steps of:
   a) writing one or more titles according to the method of claim 1; and
   b) finalizing said disc.

13. An apparatus for recording a playable unfinalized disc, comprising:
   a) a disc loader configured to write data to said disc and to write metadata to said disc at a position following and adjacent to said data; and
   b) a burning engine configured to send said data to said disc loader and to calculate a length of said metadata before writing said metadata to said disc, said length of said metadata based at least in part on a writing position of said data written on said disc.

14. The apparatus of claim 13, wherein said length of said metadata is sufficient to occupy a predetermined number of tracks at said writing position.

15. The apparatus of claim 14, wherein said file position mapping data comprises file position mapping tables.

16. The apparatus of claim 15, wherein said file position mapping tables comprise RSAT tables.

17. The apparatus of claim 15, wherein said file position mapping tables comprise VAT tables.

18. The apparatus of claim 13, wherein said metadata comprises file position mapping data.

19. The apparatus of claim 13, wherein said metadata comprises pointers to file position mapping data.

20. The apparatus of claim 13, wherein said metadata comprises file length data.

21. The apparatus of claim 13, wherein a content of said metadata is based at least in part on a format of said data and/or a physical format of said disc.

22. The apparatus of claim 13, wherein said disc comprises an optical disc.

23. The apparatus of claim 22, wherein said disc comprises a DVD-R disc.

24. The apparatus of claim 22 wherein said disc comprises a DVD+R disc.

25. A camcorder, comprising:
   a) a video capture device configured to produce a video signal;
   b) a data formatter configured to convert said video signal into a digital data format; and
   c) the disc recording apparatus of claim 13.

26. A personal video recorder, comprising:
   a) a tuner configured to receive a video signal;
   b) a data formatter configured to convert said video signal into a digital data format; and
   c) the disc recording apparatus of claim 13.

* * * * *